F. M. GUNN, O. BARK & W. SCOWCROFT.
VENTILATING DEVICE.
APPLICATION FILED FEB. 7, 1914.
1,135,685.
Patented Apr. 13, 1915.
2 SHEETS—SHEET 1.
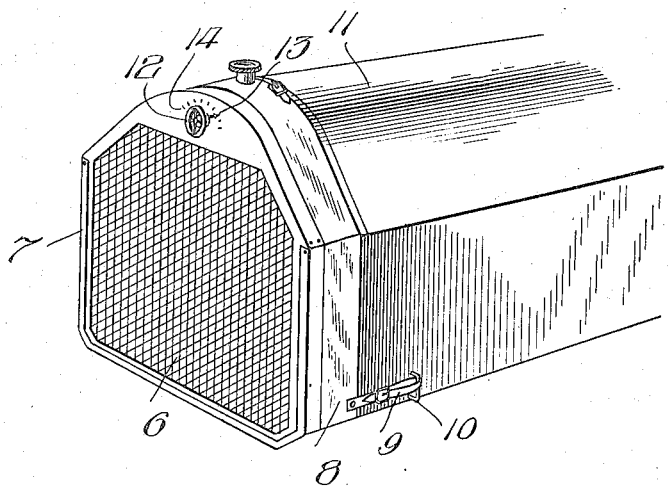
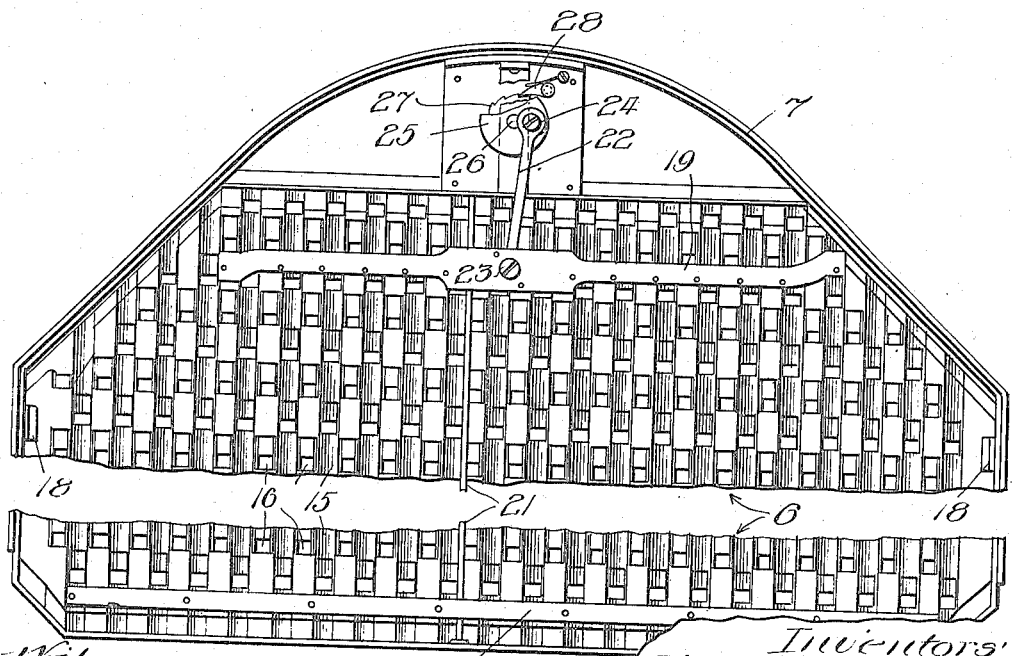

F. M. GUNN, O. BARK & W. SCOWCROFT.
VENTILATING DEVICE.
APPLICATION FILED FEB. 7, 1914.
1,135,685.
Patented Apr. 13, 1915.
2 SHEETS—SHEET 2.
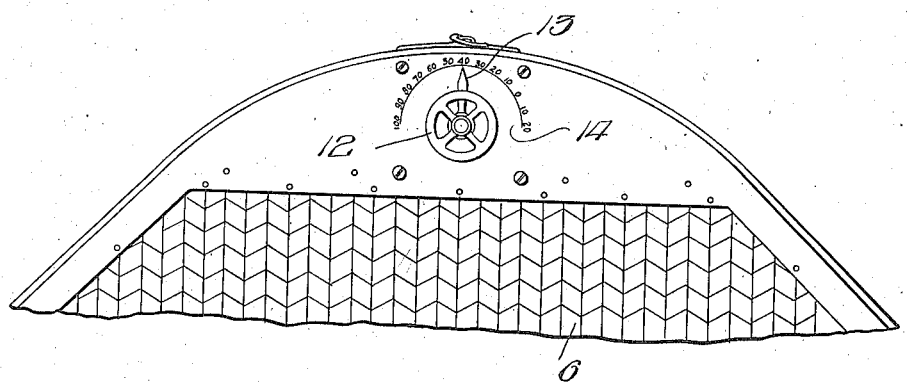
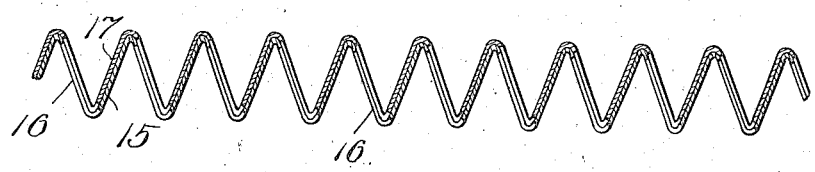
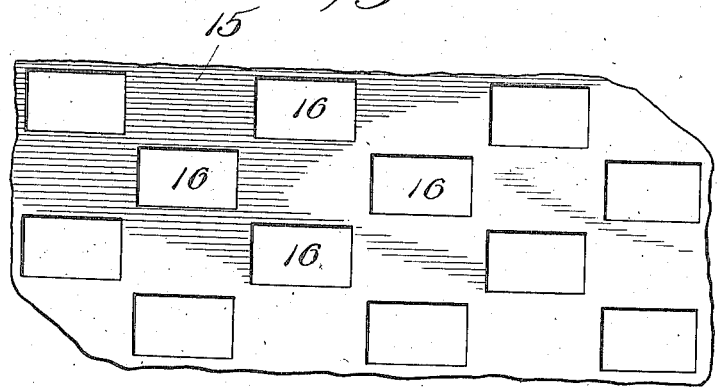

UNITED STATES PATENT OFFICE.

FRANCIS M. GUNN, OTTO BARK, AND WALTER SCOWCROFT, OF CHICAGO, ILLINOIS; SAID BARK AND SAID SCOWCROFT ASSIGNORS TO SAID GUNN.

VENTILATING DEVICE.

1,135,685.　　　　　Specification of Letters Patent.　　Patented Apr. 13, 1915.

Application filed February 7, 1914. Serial No. 817,161.

*To all whom it may concern:*

Be it known that we, FRANCIS M. GUNN, OTTO BARK, and WALTER SCOWCROFT, citizens of the United States, residing at Chicago, in the county of Cook and State of Illinois, have invented certain new and useful Improvements in Ventilating Devices, of which the following is a specification.

Our invention relates to an improved means for controlling and regulating the flow of an elastic medium, such as air, the device being particularly suited for use in connection with automobiles where a regulation of the quantity of air which comes in contact with the engine radiator is a matter of high importance.

We have aimed to provide in our device a damper or slide valve capable of shutting off entirely the flow of air to a given point, or of freely permitting the flow of air thereto without the interposition of any substantial obstruction or interfering parts. It has been further sought to provide a ventilator, the total area of the openings through which shall equal or exceed that of the openings in which the device is utilized. We also have aimed to provide means for controlling the flow of air through the ventilator which is positive in operation, simple in construction, and incapable of being shifted or displaced from any desired position of adjustment. In connection with such adjusting means, we have also provided an indicator, the object of which is to enable the operator to more accurately and intelligently adjust the position of the damper or slide valve with reference to the conditions prevailing and the regulation required in consequence. It has further been our aim to arrange the ventilating device, including a damper or slide valve and adjusting mechanism therefor, in a compact, efficient, and serviceable manner within a suitable frame in such a way as to render the device readily attachable to or detachable from its place of use according as may be found desirable. These and other objects will more clearly appear from the description of our invention as hereinafter set forth and claimed.

In the drawings: Figure 1 is a perspective view of a device embodying our invention shown as applied to the hood of an automobile; Fig. 2 is a rear elevation of the device, showing the mechanism by which the damper or slide valve is adjusted; Fig. 3 is a front elevation of the upper portion of the ventilator, showing the hand wheel and indicator used to effect an adjustment of the damper or slide valve; Fig. 4 is an enlarged fragmentary view in cross section through the device; and Fig. 5 is a fragmentary view of a blank of metal from which the principal parts of the device may be advantageously formed.

As best shown in Fig. 1, our invention comprises a ventilator 6 through which the passage of air is regulated, and which is suitably mounted within a frame 7, the frame and ventilator being secured in its intended place of use (here represented as an automobile hood) as through the medium of a band 8 which may conveniently be formed of leather. Straps 9 secured to the band may be looped through suitable eyes 10 on the automobile hood 11 to effect a connection that is readily established or disestablished whenever necessary. A hand wheel 12 is shown projecting slightly forward from the upper portion of the frame 7 carrying an indicator 13 which moves operatively with respect to a dial 14, so that whatever adjustment is required of the ventilating device may be readily made, the hand wheel alone being manipulated, and the indicator consulted, for this purpose.

The ventilator 6 consists of a fixed grid 15 having a number of openings 16 formed therein, these openings, as best shown in Fig. 5, occurring in courses, both horizontally and vertically, and preferably staggered as shown. The fixed grid 15 is bent in corrugated or zigzag fashion, as shown in Fig. 4, in such a manner that the openings 16 occur in regular horizontal courses facing first in one oblique direction and then another alternately throughout the vertical length of the ventilator. A damper or slide valve 17 which, for purposes of convenience, will hereafter be termed the movable grid, is bent in exact conformity with the fixed grid 15, and is provided with openings similarly arranged so as to register therewith. This movable grid is operatively positioned immediately behind and adjacent to the fixed grid 15, and is capable of a limited vertical sliding movement sufficient to cover or uncover all of the openings 16 in the fixed grid according as may be desired for the purposes of ventilation. As best shown in Fig. 2, this movable grid is held in operative position within the frame 7 as by means of guide members 18, and is reinforced at its upper and lower portions as by means of cross bars 19 and 20 respectively, and additionally if desired, by one or more vertical supports 21.

The mechanism utilized for moving the damper or slide plate comprises a link 22, one end of which is pivoted as to the cross bar 19 at 23 and the other end 24 to a revoluble disk or wheel 25. A shaft 26 locks the wheel 25 with the hand wheel 12, which, as before stated, is accessible of manipulation on the forward side of the device, as best shown in Fig. 1, said shaft 26 also being locked to a ratchet wheel 27, the teeth of which are engaged by a pawl 28 preferably held in operative position by tension means. The bearings for the shaft 26 and the pawl 28 are carried within the frame 27 on the rear side thereof, so that the entire mechanism for operating the movable grid is concealed from view, only the hand wheel 12 being visible from the forward side of the device. It will readily be understood that manipulation of the hand wheel 12 may be effected in one direction only due to the action of the pawl 28 which engages with the teeth of the ratchet wheel 27, and that during one half of its cycle of rotation the movable grid will be moved in one direction and in an opposite direction during the other half of its cycle of rotation. The length of the stroke of the link 22 in practice would be designed in reference to the height of the openings 16 in the fixed grid 15, so that at the completion of one stroke of the movable grid all of said openings will be completely uncovered, whereas at the completion of the return stroke of the link, all of said openings will be completely and entirely closed.

In the embodiment of our invention, we find it is possible to so proportion and arrange the openings 16 in the grids 15 and 17 that their sum total area will exceed the area of the space in which the device operates. In other words, when the movable grid is adjusted to provide the maximum free area, practically the same quantity of air can pass through the ventilator as would be the case if the device were entirely removed from its place of use. This is possible because of the fact that the grid when bent in the corrugated or zigzag fashion best shown in Fig. 4, represents in effect a series of triangles, only two sides of which are utilized. Since the combined distance around two sides of a triangle must of necessity exceed that of the third, it is possible by properly designing the openings 16 with reference to the angular corrugations or zigzags of the ventilator to increase the free area greater than the area of the opening in which the device operates. While it is true that this angular disposition of the openings cause an increase of skin friction and diversions of air currents, it is found that for practical purposes, such factors offer a negligible amount of resistance. The action of the ventilator just described is, therefore, an important feature of our invention, as any substantial interference with or obstruction to the flow of air to a given point would seriously impair if not totally destroy the usefulness of the device. In this connection, it is also manifest that the blank portions of the grid are angularly disposed in such manner as to act as baffles, and tend for this reason to guide or deflect currents of air through the openings 16 in a slightly oblique direction. Where the device is used immediately in front of the coils of an engine radiator in an automobile, it will be found that the air passing through the ventilator in different directions, will act upon the radiator coils in a highly efficient manner, to effect a cooling thereof. It is, of course, obvious that this action will be enhanced when an automobile is in operation, and a pressure of air against the front of the ventilator is created by movement of the vehicle.

It is to be noted that a series of graduations appear on the dial 14 to which the indicator 13 normally points. When the device is to be used on an automobile, these marks may be made to represent different temperatures, and an operator may, therefore, when adjusting the movable grid point the indicator 13 to the dial figure which represents approximately the prevailing temperature, whereupon an adjustment of the sum total free area in the ventilator will automatically take place, such as to permit the passage through the device of a quantity of air best calculated with reference to the work which it must do. For instance, with a prevailing temperature of 20 degrees above zero, the indicator would be pointed to the figure 20 and the adjustment resulting would provide but a small amount of passageway for air, whereas with a prevailing temperature of 90 degrees, the indicator would properly be pointed to the figure 90, whereupon the sum total free area through the device would be greatly increased. The teeth of the ratchet wheel 27, may, furthermore, be spaced apart to correspond with certain of the graduations upon the dial, so that when the hand wheel is manipulated and the pawl engages successively with each advancing tooth, the click occasioned thereby will indicate to the ear of the operator that an adjustment for, say, five or ten degrees has been effected, thus assisting in making any adjustments of the movable grid where the light is so dim as not to permit a reading of the dial.

It is to be noted that the weight of a vertically movable grid, such as has been described, must, under all conditions of use, be carried by the link 22 and the mechanism by which the same is operated, so that were it not for the action of the pawl 28 on the ratchet wheel 27, the action of gravity would cause the movable grid to move downwardly, and thus be displaced from its intended adjustment. In the embodiment of our invention, such a contingency is provided for, and it is impossible for the relative adjustment of the fixed and movable grids to be changed regardless of how much vibration or jolting the device may be subjected to. The utility of this precautionary arrangement is apparent where the device is used under conditions of vibration and jolting, such as are present in the case of automobiles. We prefer a construction of operating mechanism for adjusting the movable grid in which the hand wheel shall turn in but one direction only, as the pawl engaging with the ratchet wheel will thus act positively to prevent a downward movement of the movable grid, due to the action of gravity, but this construction may be varied somewhat so that the hand wheel may be revolved in either direction according as is necessary to effect the proper adjustment, a ratchet wheel, the teeth of which are not cut radially but rather of equal length, being substituted in such case to permit of the pawl or trigger engaging therewith being displaced upon rotary pressure in either direction.

It is apparent from the foregoing description that the device may be constructed with varying proportions to suit the requirements of its intended use. The angularity of the bends in the fixed and movable grids may be determined with reference to the sum total of free area which it is desired should be present in the device. In practice, we prefer to construct the device of sheet metal, such as aluminum, the openings through the grids being punched out in any suitable manner. By constructing the frame within which the grids are mounted with a flange extending rearwardly a distance equal to the depth of the corrugations or zigzags of the grids sufficient space will be provided for housing the adjusting mechanism without causing any of the operating parts to protrude beyond the plane of the rear face of the device. If the ventilator is constructed for more or less temporary attachment, the value of this compact arrangement of the parts becomes apparent.

We claim:

1. A ventilator embodying in combination a member having a corrugated cross section and provided with a plurality of openings therein, a second member operatively positioned adjacent said first member having a similar cross section and provided with openings therein corresponding to those in said first member, and means for effecting a relative sliding movement between said members to vary the total area of openings therebetween.

2. A ventilator embodying a plate-like member having a straight line corrugated cross section provided with a plurality of openings therein arranged in each of the planes thereof, said openings being proportioned with respect to the plate-like member to provide a sum total free area not less than the area bounded by the outside edges of said plate-like member, and means for controlling the passage of air through the openings of said plate-like member.

3. A ventilator embodying a plate-like member having a straight line corrugated cross section provided with a plurality of openings therein arranged in each of the planes thereof, each of said openings having adjacent thereto an angularly disposed blank space which serves as a baffle therefor, said openings being proportioned with respect to the plate-like member to provide a sum total free area not less than the area bounded by the outside edges of said plate-like member, and means for controlling the passage of air through the openings of said plate-like member.

FRANCIS M. GUNN.
OTTO BARK.
WALTER SCOWCROFT.

Witnesses:
F. H. SORGENFREI,
M. R. THOMPSON.